United States Patent Office 3,615,081
Patented Oct. 26, 1971

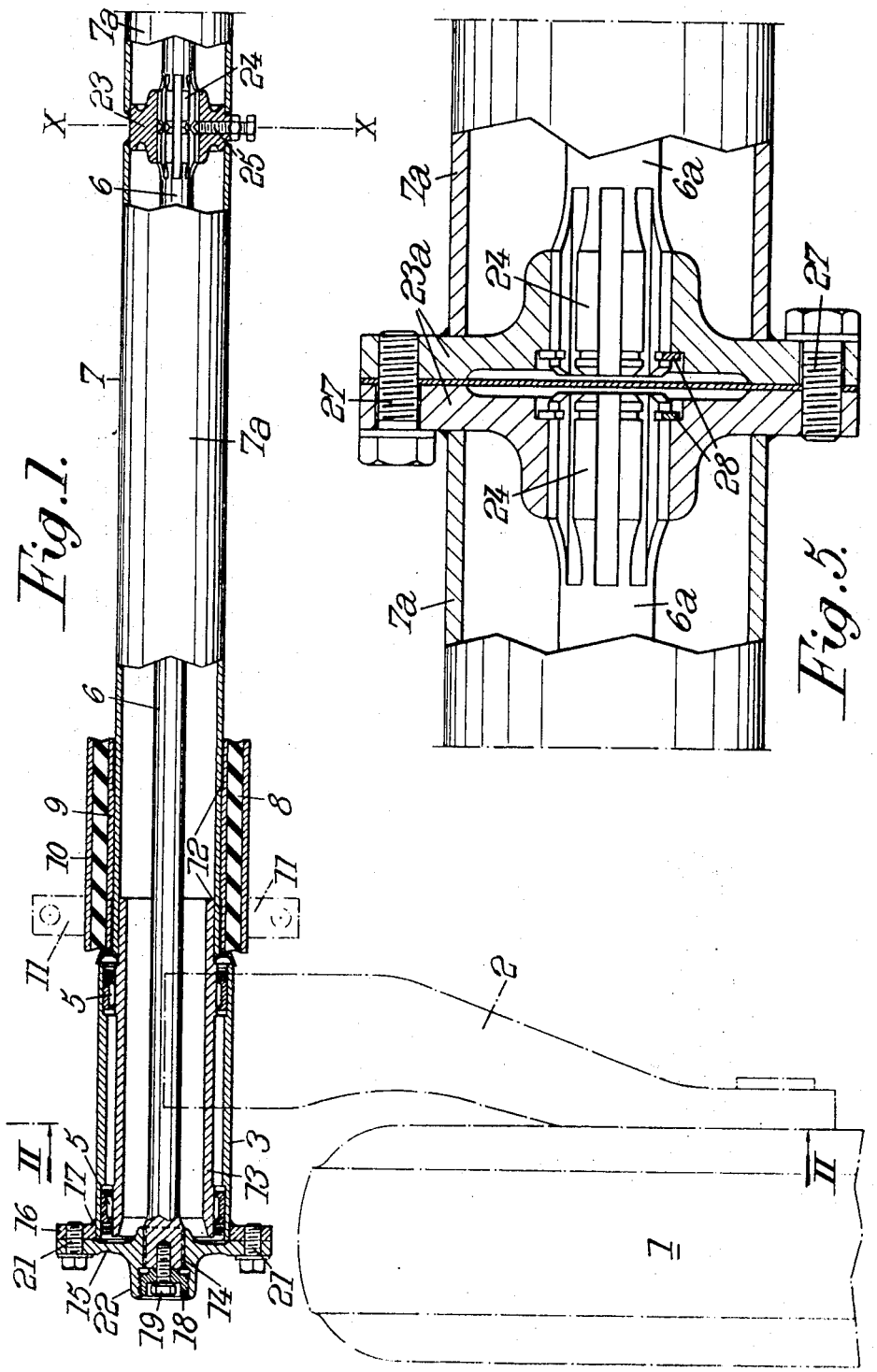

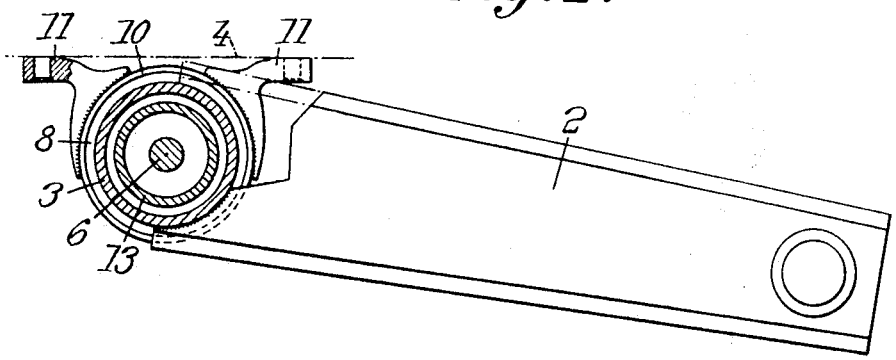
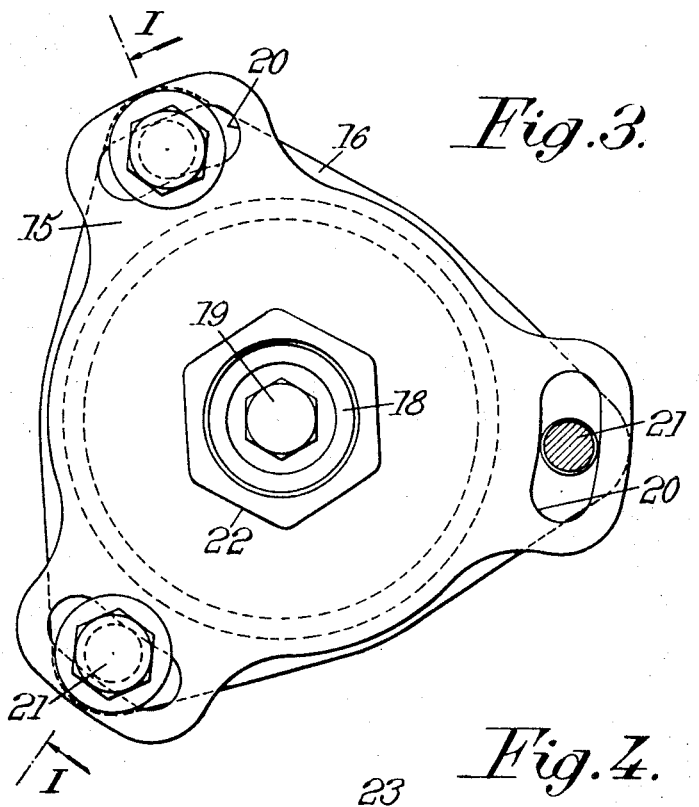
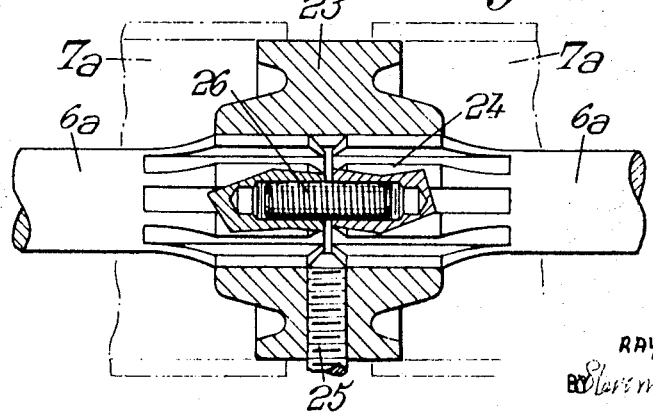

3,615,081
TORSION BAR SUSPENSION SYSTEMS FOR MOTOR VEHICLES
Raymond A. Ravenel, Sceaux, France, assignor to Societe Anonyme Andre Citroen, Paris, France
Filed July 22, 1968, Ser. No. 746,344
Claims priority, application France, Aug. 1, 1967, 116,541
Int. Cl. B60g 11/18, 11/60, 3/14
U.S. Cl. 267—57  8 Claims

ABSTRACT OF THE DISCLOSURE

In a vehicle suspension system each wheel of a pair is rotatably mounted at one end of an arm, the other end of which is pivotally mounted on the end of a transverse tubular member. The arms are secured to the outer ends of a torsion bar means extending within the transverse member and secured to the middle of the transverse member. The transverse member itself is connected to the vehicle body through resilient blocks which insulate the vehicle body from vibration from the wheels and arms and act as additional torsion elements.

---

The invention relates to motor vehicle suspension systems, in which a pair of transversely aligned wheels are each borne by a substantially horizontal arm pivotally mounted on the vehicle, each arm being connected to an end of a transverse torsion bar which provides a resilient suspension for the associated wheel.

It is an object of the invention to provide an improved suspension system of the kind specified which insulates the vehicle body from the jolts and noises of travel.

A suspension system according to the invention comprises at least one pair of wheels aligned with each other on opposite sides of the vehicle, a generally horizontal arm supporting each wheel rotatably at one end thereof, a transversely extending tubular member rotatably connected to the other ends of said arms, resilient blocks adjacent the outer ends of the transversely extending tubular member connecting an anchoring the tubular member to the body, torsion bar means extending co-axially within said transverse tubular member, includng a torsion bar portion for each arm fixed at its outer end to said other end of its arm and fixed at its inner end to said transverse tubular member, whereby the blocks operate both as torsion members and vibration filtering members between the arms and the vehicle body.

Various embodiments of the invention will now be described with reference to the accompanying drawings, in which:

FIG. 1 shows a suspension system according to the invention in plan with portions in horizontal section, along the line I—I of FIG. 3;

FIG. 2 is a vertical section, taken along the line II—II of FIG. 1;

FIG. 3 shows in end elevation, to a larger scale, certain elements illustrated in FIG. 1, viewed from the left-hand side thereof, and FIG. 4 is a detail section view of a modification of the suspension system of FIGS. 1 to 3, and FIG. 5 is a detail section view of a further modification of the suspension system of FIGS. 1 to 3.

Referring to FIG. 1 the vertical plane extending through the longitudinal axis X—X of the vehicle in FIG. 1 forms a plane of symmetry for the suspension system. The suspension system is so constructed that the rear wheels 1 are each borne by an arm 2 which has a length greater than the radius of the wheel 1 and is rigidly connected with a hub 3 mounted via a transverse bearing 5 (formed, for instance, by the assembly of two needle bushes, or two cylindrical roller bearings), on the end of a transverse tubular member 7. The hubs 3 of the two arms 2 are each connected to the respective end of a transverse torsion bar 6 disposed inside the tubular transverse member 7 to which the torsion bar 6 is anchored at a central zone.

The transverse member 7 is anchored to the vehicle body 4 adjacent its ends by two blocks 8 of rubber (or some other resilient natural or synthetic material having analogous properties), which are adapted to operate under torsion. Thus each bearing 5 is insulated from the body 4 by the blocks 8.

Each block 8 has a tubular shape enabling it to be disposed around the transverse member 7 and can be bonded directly to the latter and to the vehicle body 4, or can be bonded to an inner metal sleeve 9 and an outer metal sleeve 10, which sleeves are rigidly attached to the transverse member and the vehicle body respectively. To this end, in the embodiment of FIG. 1 the outer sleeve 10 is welded to lugs 11 attached to the vehicle body by rivets or the like, and the inner sleeve 9 is a force fit on the transverse member 7, over knurled zones 12 on the member 7 and the inner sleeve.

Each bearing 5 is disposed beyond the adjacent block 8 i.e. on the side of the adjacent block remote from the axis X—X, either on an extension of the cylindrical part of the transverse member 7, or as illustrated, on a member 13 rigidly attached to the end of said cylindrical part of the transverse member 7, and fitted into its interior as illustrated in FIG. 1.

To connect each hub 3 to the adjacent end of the torsion bar 6, the latter is fixed at each outer end to a coupling disc 15 bolted to a ring 16 fixed to the end of the hub 3, by threading the latter into the ring 16 and thereafter welding it thereto by a fillet or spots 17. The torsion bar is formed at its end with splines which fit into complementary splines in a co-axial bore in the disc 15 and the disc is held in place by means including a screw threaded plug 18 fitting a correspondingly screw threaded extension of said bore. A screw 19 extends through the plug 18 into the end of the torsion bar and holds the bar against the plug 18. The transverse position in relation to the vehicle of each arm 2 can be adjusted by slackening the screw 19 and screwing the plug 18 inwards or outwards.

The disc 15 is formed so as to enable the angular position of the hub 3 with respect to the torsion bar to be adjusted. The disc 15 has arcuate slots 20 (FIG. 3) through which bolts 21 screwed into the ring 16 extend and the disc has a hexagonal boss 22 adapted to fit a suitable spanner. When the bolts 21 have been loosened, the hub 3 can be rotated into the required angular position by a spanner applied to the boss 22 and then retained in that position by tightening the bolts 21.

The torsion bar 6 is anchored to the transverse member 7 in the region of the axis X—X. The transverse member 7 is divided into two aligned elements 7a each welded to central member 23 FIG. 1 formed with internal splines receiving splines 24 with which the central portion of the bar 6 is formed. A screw 25 is provided to prevent the bar 6 from moving inside the member 23.

In the embodiment illustrated in FIG. 1, the torsion bar is in one piece 6, while in the variants illustrated in FIGS. 4 and 5, the torsion bar is formed by two aligned portions 6a each having splines 24 which both anchor the torsion bar to the central member 23 (or 23a in FIG. 5) and hence to the transverse member 7 and thus anchor the two portions 6a to one another. In the embodiment shown in FIG. 4, a screw threaded pin 26 is also provided to hold the portions 6a together and together with the screw 25 to prevent the portions 6a from moving inside the member 23.

In the variant illustrated in FIG. 5, the torsion bar and the transverse tubular member are each made up of two elements 6a and 7a respectively, and the one-piece member 23 used in FIGS. 1 and 4 is replaced by an assembly of two parts 23a each welded to one of the two elements 7a of the transverse member, the two parts 23a having flanges secured to one another by screws 27 on opposite sides of a circular plate sandwiched between the flanges. Plates of various thicknesses can be used to adjust the length of the member 7. The elements 6a and the parts 23a have complementary splines which hold the elements 6a angularly and the elements 6a carry circlips 28 in grooves at their inner ends between the parts 23a which cooperate with internal shoulders with which the parts 23a are formed, whereby the elements 6a are secured axially.

The suspension system operates as follows. Any vertical force applied to the vehicle body 4 tends to raise or lower the wheels 1 in relation to the vehicle body, by making their respective arms 2 rotate around the bearings 5 of their hubs 3. This rotation is transmitted to the ends of the torsion bar 6 (6a), which twists between its outer ends, and its central portion anchored in the member 23 (23a). The reaction of the latter causes a rotation of the transverse member 7 (7a), which is transmitted to the inner sleeves 9 of the blocks 8 (possibly minus the twisting of the transverse member, if the latter is not very rigid). The blocks 8 thus operate under torsion in series with the bar 6 (and possibly with the transverse member 7). During vertical oscillations of the vehicle therefore the flexibility of the blocks 8 (and possibly that of the transverse member 7) is added to that of the bar 6.

If the vehicle rolls, the swaying of the vehicle body tends to raise one wheel and lower the other wheel proportionately in relation to the vehicle body, causing the arms 2 to rotate in opposite directions. These rotations are transmitted respectively to the two torsion bar portions on either side of the central member, which portions twist by equal and opposite amounts, so that the member 23 and consequently the transverse member 7 and the blocks 8 undergo no angular displacement. Since only the bar 6 comes into operation in this case, the flexibility during the rolling of the vehicle is less than flexibility in the case of vertical oscillation.

The assembly of metal members which oscillate during the movements of the suspension system (hubs 3, member 13, transverse member 7, bar 6) extends through the block 8 without any possibility of direct contact with the metal members of the vehicle body 4. The blocks 8 therefore act not only as torsion springs, but also as vibration filters.

The wheels 1 are prevented from moving transversely, since the hubs 3 are secured to the discs 15 which are secured to the bar 6, the bar 6 being secured in turn to the transverse member 7 which is itself anchored to the vehicle body 4 by the blocks 8. The result is a simply and economically constructed vehicle suspension.

The bar elements 6a in the embodiment illustrated in FIG. 5 can be replaced by a single bar 6 similar to that illustrated in FIG. 1. In that case the plate sandwiched between the flanges 23a would be replaced by an annular washer to permit the passage of the single bar 6.

I claim:

1. A motor vehicle suspension system comprising:
   a tubular member extending transversely from one side to the other of the vehicle;
   on opposite sides of the vehicle:
   one of at least one pair of wheels normally aligned with each other,
   a generally horizontal arm supporting each wheel rotatably at one end thereof,
   a hollow cylindrical hub for each said arm and to which the other end of said arm is rigidly fixed,
   said transversely extending tubular member rotatably bearing said hub,
   resilient blocks respectively close to each outer end of said tubular member and including means connecting and anchoring said blocks to the tubular member and to the body of the vehicle, each said resilient block being tubular in shape and bonded to inner and outer metal sleeves, said inner and outer metal sleeves being rigidly secured respectively to said tubular member and said vehicle body, whereby said tubular member has partial torsional freedom relative to the vehicle body,
   torsion bar means extending coaxially within said tubular member, means fixing each outer end to said torsion bar means to the respective hub, and central means fixing the intermediate portion of said torsion bar means to said tubular member, whereby the blocks operate both as torsion members and vibration filtering members.

2. A motor vehicle suspension system comprising:
   a tubular member extending transversely from one side to the other of the vehicle;
   on opposite sides of the vehicle:
   one of at least one pair of wheels normally aligned with each other,
   a generally horizontal arm supporting each wheel rotatably at one end thereof,
   a hollow cylindrical hub for each said arm and to which the other end of said arm is rigidly fixed,
   said transversely extending tubular member rotatably bearing said hub,
   resilient blocks respectively close to each outer end of said tubular member and including means connecting and anchoring said blocks to the tubular member and to the body of the vehicle so as to permit said tubular member partial torsional freedom relative to the vehicle body;
   torsion bar means extending coaxially within said tubular member and having an intermediate portion and outer ends, means fixing each said outer end of said torsion bar means to the respective hub,
   and central means fixing said intermediate portion of said torsion bar means to said tubular member,
   whereby the blocks operate both as torsion members and vibration filtering members.

3. The suspension system of claim 2 wherein each said hub is connected to said transverse tubular member by a bearing disposed on the outboard side of the resilient block on its respective side of the vehicle.

4. The suspension system of claim 2 wherein said torsion bar means comprises two torsion bar portions and said means fixing each outer end of said torsion bar means to the respective hub comprises a coupling disc fixed to the outer end of each said torsion bar portion, a ring rigidly fixed to the adjacent hub and coaxial with said transverse tubular member and means for securing said disc to said ring in an adjustable angular position to enable the angular position of said arm with respect to its torsion bar portion to be adjusted.

5. The suspension system of claim 2 in which said transverse tubular member is formed by two aligned tubular elements welded at adjacent ends to opposite sides of said central means.

6. The suspension system of claim 5 wherein said torsion bar means comprises two portions, each formed as a seoparate bar anchored individually to said central means.

7. The suspension system of claim 6 wherein said central means is formed in two parts each having a flange for bolting to the flange of the other part.

8. The suspension system of claim 5 wwherein said central means is formed in two parts each having a flange for bolting to the flange of the other part.

References Cited
UNITED STATES PATENTS

| | | | |
|---|---|---|---|
| 2,270,571 | 1/1942 | Woolson et al. | 280—124.3 X |
| 2,497,072 | 2/1950 | Cooper | 280—124.3 |
| 2,840,368 | 6/1958 | Chayne et al. | 267—57 |
| 3,298,711 | 1/1967 | Hickman | 267—57 X |

FOREIGN PATENTS

| | | | |
|---|---|---|---|
| 815,608 | 7/1959 | Great Britain | 280—124.3 |
| 826,698 | 2/1952 | Germany | 280—124.3 |

A. HARRY LEVY, Primary Examiner

U.S. Cl. X.R.

280—124